April 5, 1938. LE ROY SHULMAN ET AL 2,112,930
SLEEVE LENGTH COMPARISON DEVICE
Filed March 17, 1937 5 Sheets-Sheet 1
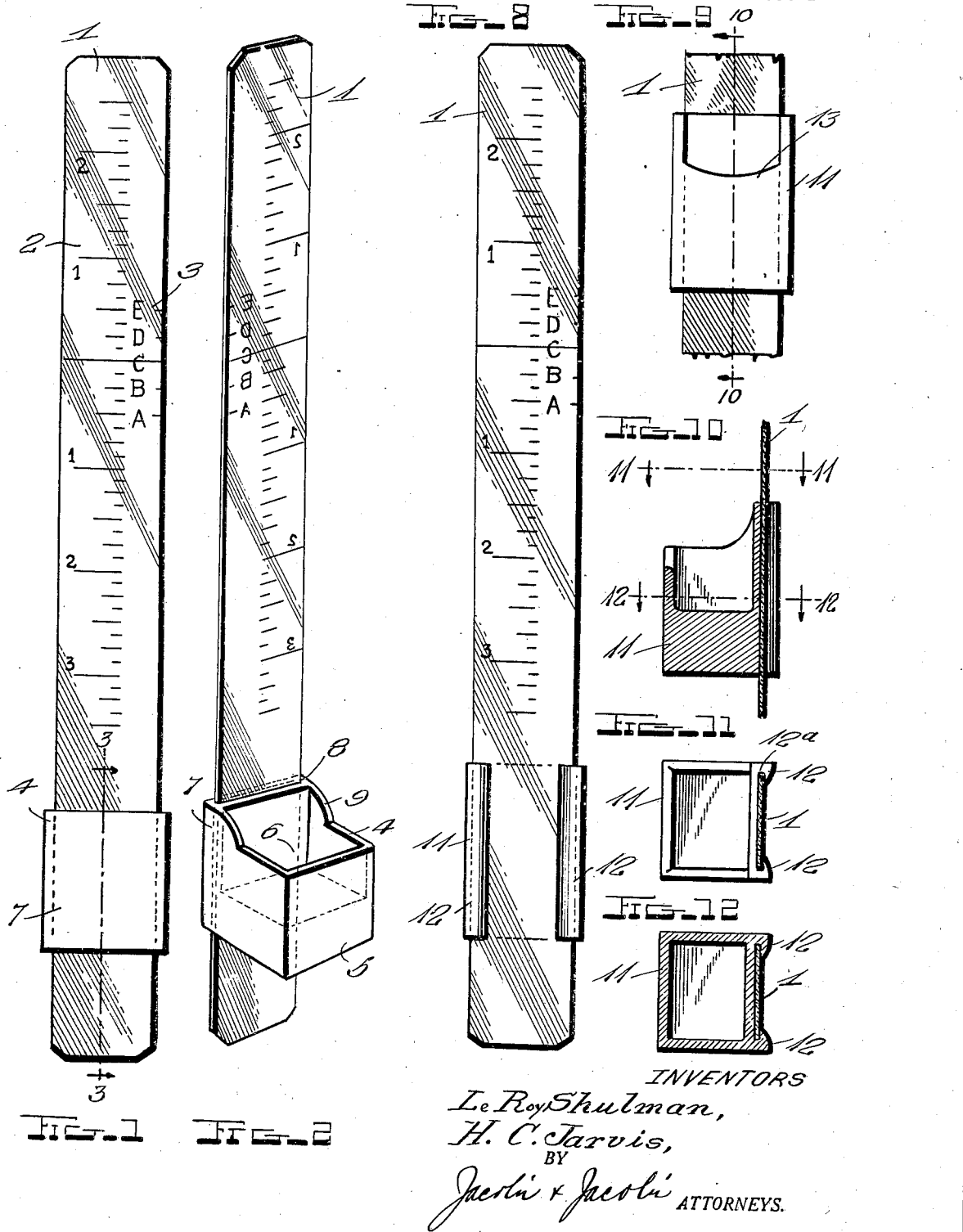

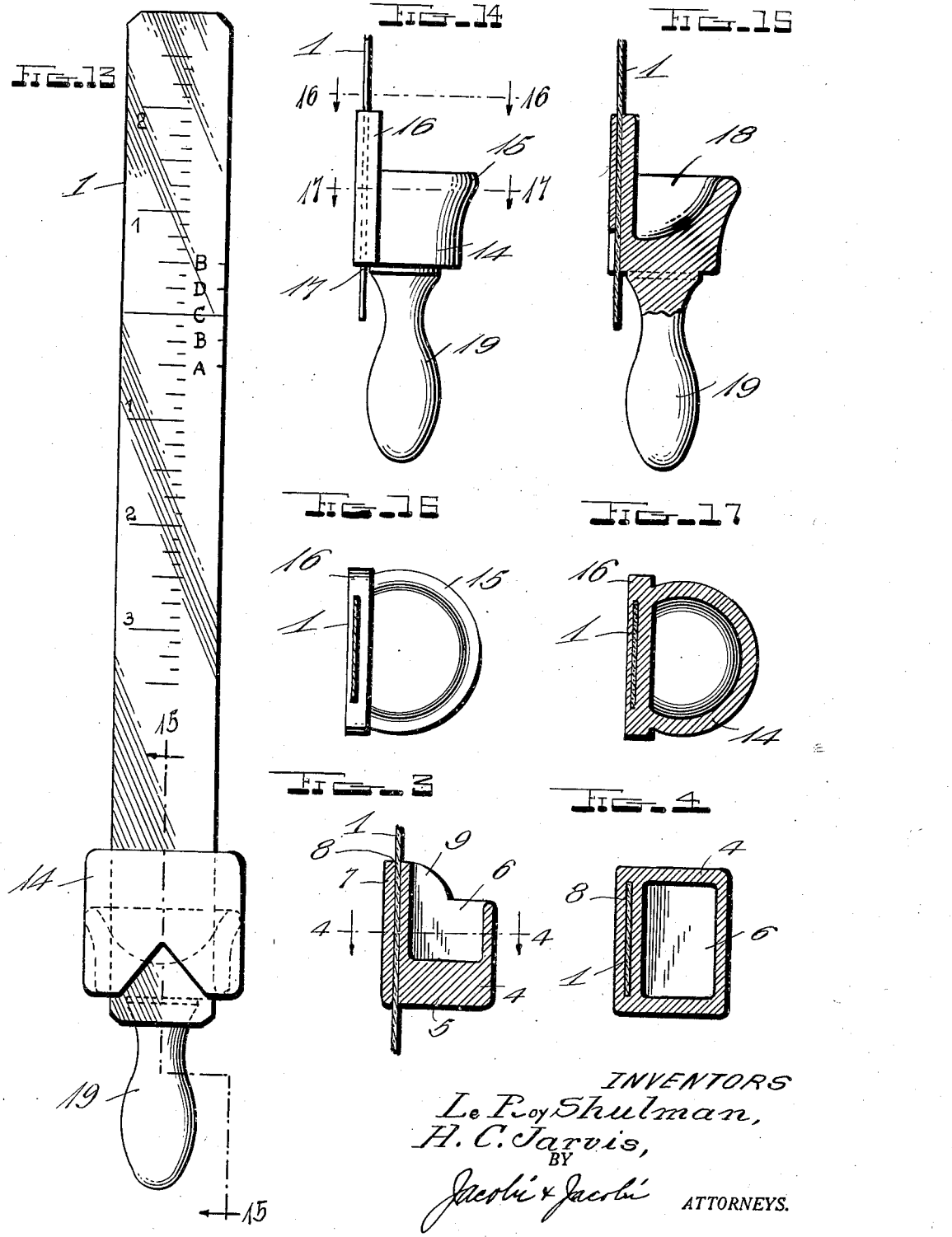

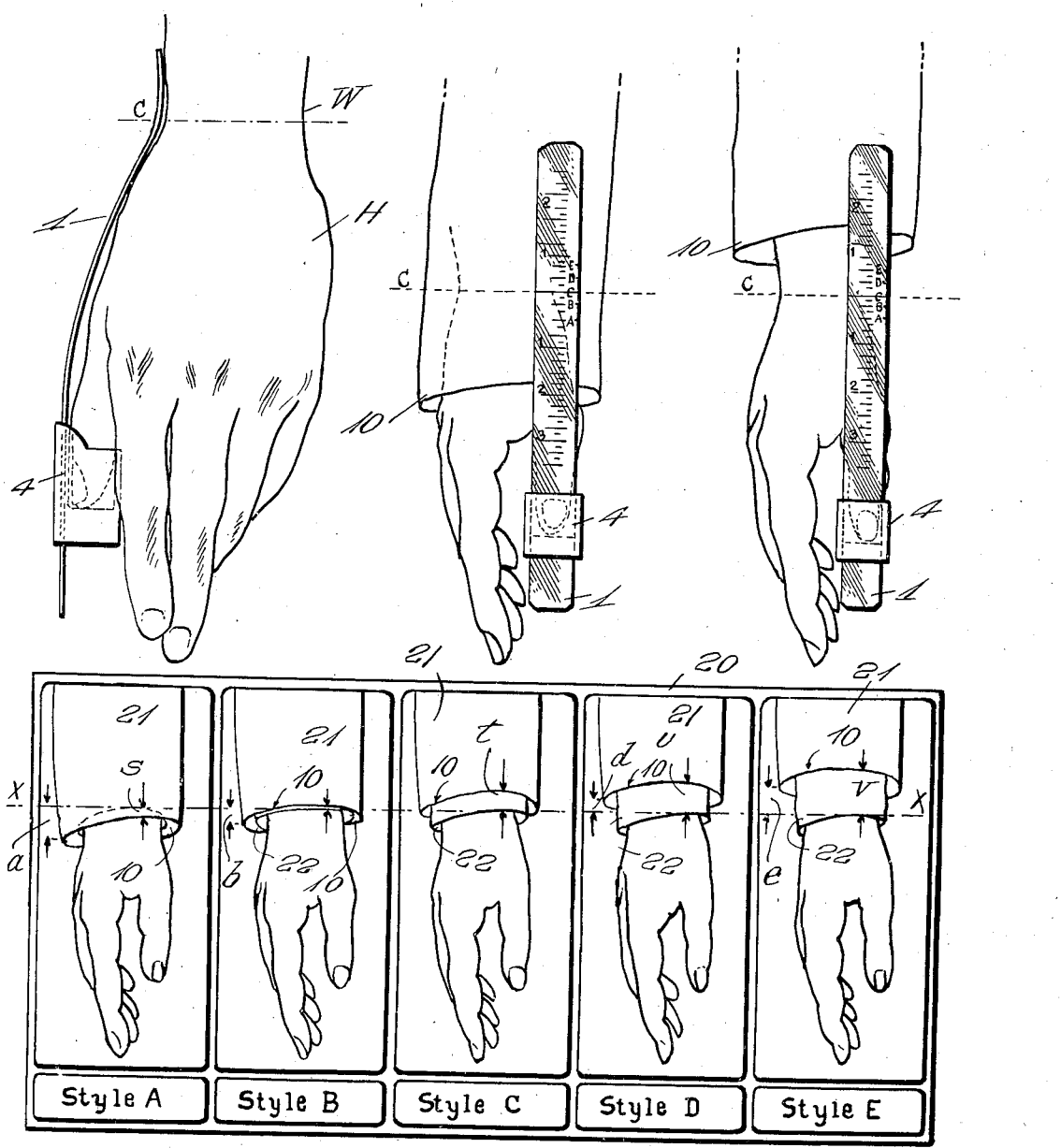

April 5, 1938. LE ROY SHULMAN ET AL 2,112,930
SLEEVE LENGTH COMPARISON DEVICE
Filed March 17, 1937 5 Sheets-Sheet 4
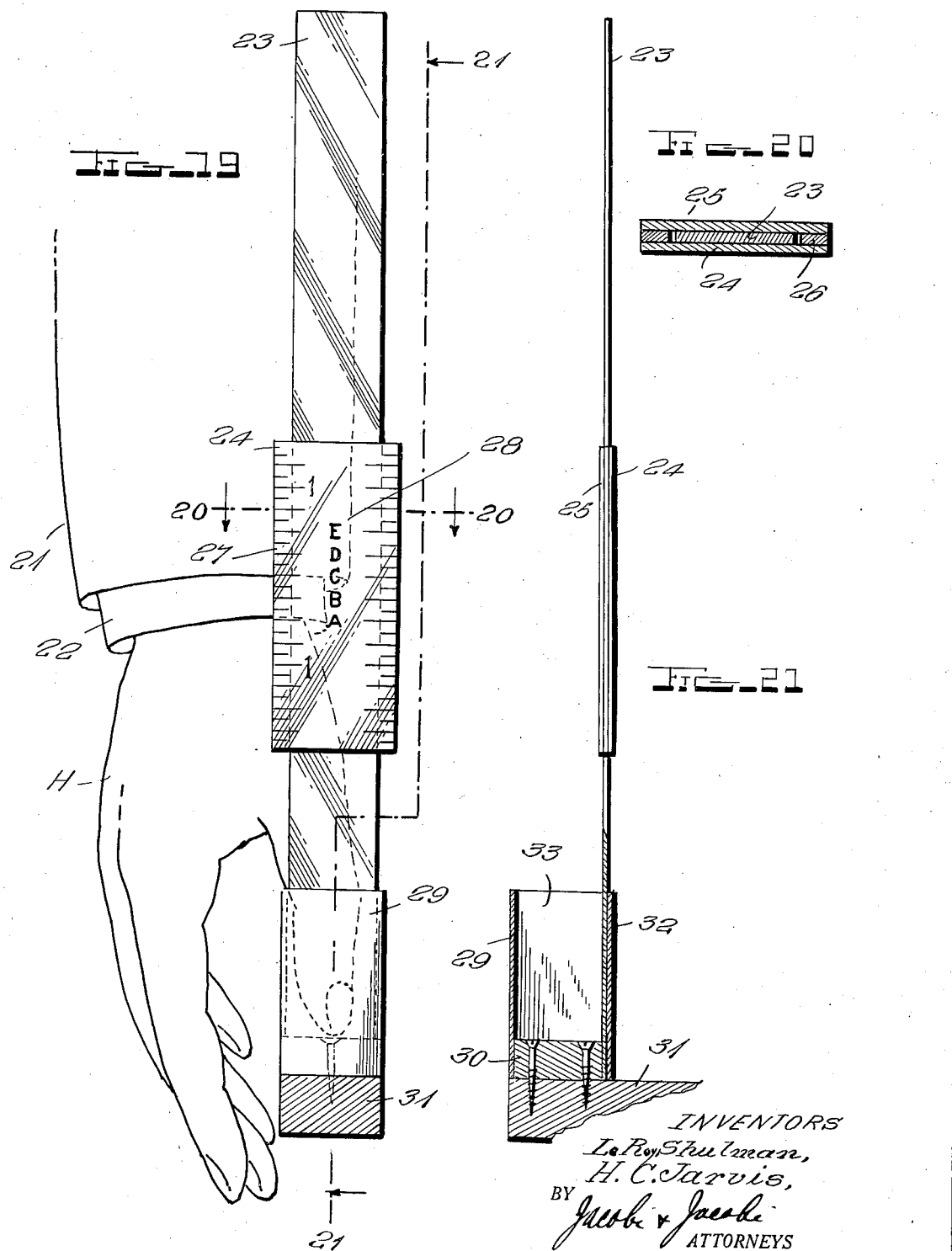
INVENTORS
Le Roy Shulman,
H. C. Jarvis,
BY Jacobi & Jacobi
ATTORNEYS April 5, 1938.   LE ROY SHULMAN ET AL   2,112,930
SLEEVE LENGTH COMPARISON DEVICE
Filed March 17, 1937   5 Sheets-Sheet 5
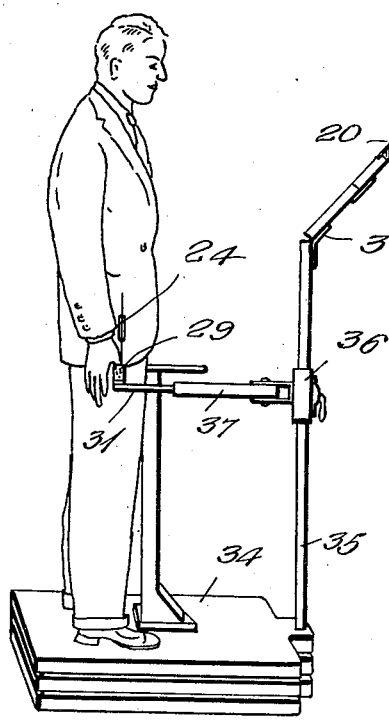
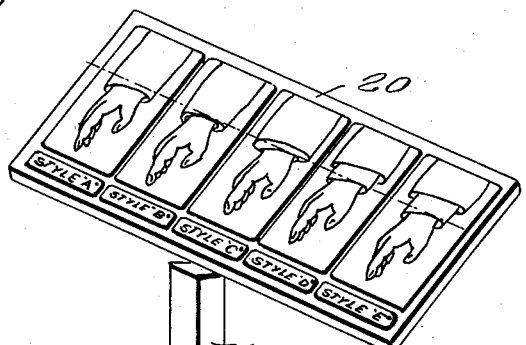
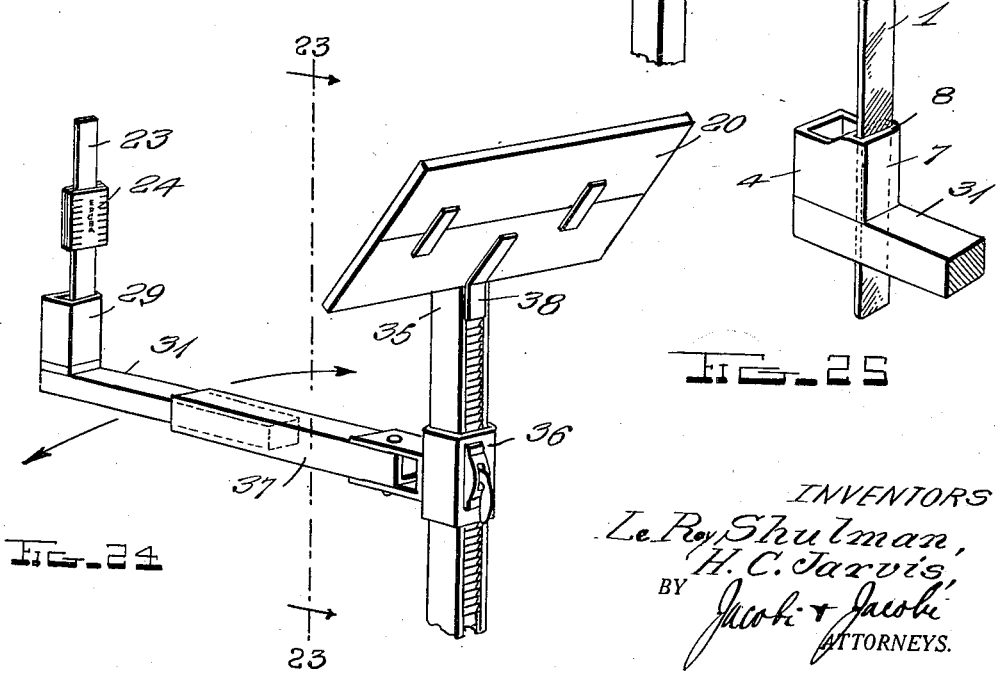
INVENTORS
Le Roy Shulman,
H. C. Jarvis,
BY Jacobi & Jacobi
ATTORNEYS.

Patented Apr. 5, 1938

2,112,930

UNITED STATES PATENT OFFICE 2,112,930

SLEEVE LENGTH COMPARISON DEVICE

Le Roy Shulman and Henry C. Jarvis, Norfolk, Va., assignors to Shulmansizer, Incorporated, Norfolk, Va.

Application March 17, 1937, Serial No. 131,467

18 Claims. (Cl. 33—2)

Our invention relates to a sleeve length comparison device for use by tailors in order to determine the proper lengths to be given to the sleeves of a coat in order that the sleeves may present the desired appearance on the wearer.

It is an object of our invention to provide a device which may be positioned in fixed relation on the hand of a person and which comprises adjustable means for indicating lengths measured from the point of inflection of the wrist or carpus to a desired terminal point of a sleeve.

It is another object of our invention to provide such a device which will easily and firmly engage the thumb.

A further object of our invention is to provide such a device wherein the measuring means adjacent the wrist and terminal point of the sleeve are transparent and flexible.

It is another object of our invention to provide an arrangement comprising a sleeve length style display chart and a graduated sleeve length measuring device having graduations which correspond to the different lengths of sleeve shown on the display chart.

Our device is particularly adapted for use by tailors in making measurements at the try-on of a custom-made suit, or in determining how to finish a ready-made coat having unfinished sleeve ends, or how to alter a ready-made coat having finished sleeve ends.

In making ready-made clothing, both sleeves of a coat are supposed to be made of the same length at the factory, but this is not always accurately done. In measuring a person for a custom-made suit, it is often difficult to make measurements so accurately before try-on as to determine exactly any difference which should be made in the lengths of the two sleeves, and unless there is an appreciable difference in the lengths of the two sleeves, they will both be made of the same length for try-on, even in custom-made suits.

Unequal lengths of sleeves may be required because some men have one arm a little longer than the other, because one shoulder may be a little higher than the other, or because of a prominent shoulder blade. Our device quickly and accurately discloses such conditions.

Experience indicates, however, that in order to present a proper appearance on some persons, the lengths of the two sleeves of a coat should often differ by as much as a quarter or half of an inch, or even more.

In ordinary practice, a tailer will determine a sleeve length by measuring from the armpit to a point on the wrist which he determines in his own mind as being spaced from the point of inflection by a suitable distance according to his interpretation of what the customer tells him as to the sleeve length style desired. This is often unsatisfactory.

The appearance of the length of a coat sleeve is usually determined by the eye of an observer with reference to the position of the end of the sleeve with reference to the point of inflection of the wrist or carpus, that is, the narrow point at which the hand joins the fore-arm. If the end of the sleeve is much above this point of inflection, the coat sleeve appears too short. If the end of the sleeve is too far below this point of inflection, the coat sleeve appears too long.

At a coat try-on, the usual practice is simply for the tailor to observe the appearance of the sleeves on the wearer, and if either sleeve appears to be of incorrect length to present a proper appearance, to turn that sleeve up or down as may be necessary, and then pin it in place. This practice is inexact and unsatisfactory, and does not afford a proper basis for correcting the customer's measurement record, with a view to making the customer's next coat to more exact measurements.

Our invention provides a device which the tailor may instantly place on the thumb of the customer, and adjust a movable part of the device to indicate the distance from the point of inflection of the wrist to the end of the sleeve of the coat being worn by the customer.

Our invention further provides a device which can be so placed on the thumb of the customer, and wherein the movable part of the device carries separately a plurality of identified spaced marks which will indicate to the tailor to which one of a plurality of separately identified style charts mounted within the view of the customer, the sleeve length being worn by the customer corresponds.

Still another object of the invention resides in providing a device which is simple and durable in construction, inexpensive to manufacture and one which will be very efficient in operation.

With these and numerous other objects in view, our invention consists in the novel features of construction, combination and arrangement of parts as will be hereinafter referred to and more particularly pointed out in the specification and claims.

In describing the invention, we shall refer to the drawings in which similar reference characters designate corresponding parts throughout the several views.

Figure 1 shows in rear elevation an assembled view of one form of our sleeve measuring device, having a rule slide with solid back, with the graduated lineal measuring element or rule slidable through the thumb cup;

Figure 2 shows a perspective view of the device of Figure 1;

Figure 3 shows a fragmentary longitudinal sectional view on the line 3—3 of Figure 1 of the portion of the measuring device adjacent the thumb cup, perpendicular to the plane of the lineal measuring element;

Figure 4 shows a horizontal transverse sectional view of the device taken on the line 4—4 of Figure 3;

Figure 5 shows a front elevation assembled view on the hand of the form of device of Figure 1, with the thumb cup in place on the thumb, and the flexible lineal measuring element in place on the wrist;

Figure 6 shows a side elevation assembled view on the hand of the form of device on Figure 1, with the thumb cup in place on the thumb, with a long sleeve;

Figure 7 shows a view similar to Figure 6, with a short sleeve;

Figure 8 shows in rear elevation an assembled view of a modified form of our measuring device having a rule slide with open back and lateral grooved guides;

Figure 9 shows in front elevation a portion of the form of Figure 8 including the thumb cup;

Figure 10 is a fragmentary vertical longitudinal sectional view taken on the line 10—10 of Figure 9;

Figure 11 is a fragmentary horizontal sectional view taken on line 11—11 of Figure 10, and showing the thumb cup;

Figure 12 is a horizontal transverse sectional view taken on the line 12—12 of Figure 10 through the thumb cup;

Figure 13 is a rear elevation of another form of our invention, with a thumb cup having a rule slide with solid back, and the thumb cup being formed as a recessed half of a solid of revolution;

Figure 14 is a side elevation of a portion of the form of Figure 13, showing the thumb cup in elevation;

Figure 15 is a sectional view of the lower portion of the form of Figure 13, taken on the line 15—15 of Figure 13;

Figure 16 is a fragmentary horizontal sectional view of the form of Figure 13, taken on the line 16—16 of Figure 14;

Figure 17 is a horizontal sectional view taken on the line 17—17 of Figure 14;

Figure 18 is a detailed view of the style chart showing styles of sleeve lengths corresponding to the rule scale graduations, which is displayed to the customer being measured;

Figure 19 is a front elevation of an assembled view of another form of our measuring device wherein the linear element is held stationary relative to the thumb, and the graduated rule element slides on the linear element;

Figure 20 is a horizontal sectional view of the form of Figure 19, taken on the line 20—20 of Figure 19;

Figure 21 is a transverse vertical sectional view of the form of Figure 19, taken on the line 21—21 of Figure 19;

Figure 22 is a perspective view of the form of device of Figure 19 mounted on a standard carrying the style chart in view of the customer being measured;

Figure 23 is a detail sectional perspective view of the style chart mounted on the standard of Figure 22, showing the manner of displaying the style chart, taken on the line 23—23 of Figure 24;

Figure 24 is a rear perspective detail view of the arrangement of Figure 22, showing the structure of the standard and mounting of the form of the thumb cup shown in Figure 19; and Figure 25 is a perspective view of the supporting arm carrying the form of thumb cup shown in Figure 2.

We provide a scale member graduated in letters corresponding to sleeve length styles which is slidably adjustable along the wrist. A determined point of such scale member is positioned at the point of inflection of the wrist above mentioned, and the letter is read corresponding to the graduation positioned at the desired position of the bottom of the sleeve. The device may be used in taking a preliminary sleeve length measurement for a custom-made coat by measuring from the arm pit to the lettered graduation corresponding to the desired position of the bottom of the sleeve. We provide a flexible lineal measuring element and scale member, adapted to fit easily over the wrist, and transparent so that the contour of the wrist is easily visible therethrough. We provide a thumb-piece provided with a recess which is approximately elliptical or conical and is adapted to tightly fit the thumb and hold it tightly without slipping when the thumb is pressed thereagainst. We provide a style chart illustrating a number of different lengths of sleeves as they appear on a person and identify each length by a letter corresponding to the designations of the graduations on the scale member which we use in measurement, and we provide means for mounting such style chart in the field of view of the customer at the time his sleeve measurement is being made.

Referring to the figures in detail, in Figure 1, there is shown at 1 a lineal measuring element which is advantageously flat, and is preferably transparent, and preferably resiliently flexible so that it will easily bend out of its flat position but return thereto when the distorting force is removed. This lineal measuring element or rule may be made of any one of various transparent plastic materials which are now available, including celluloid and transparent viscose plastics. Lineal measuring element 1 is provided with regular graduations 2, as in inches, and is further provided with lettered spaced graduations A, B, C, D, E, etc., as shown at 3, these letters corresponding to certain styles of sleeve lengths as below explained. A thumb cup is shown at 4 which is associated with lineal measuring element 1. The thumb cup 4 has a base 5 and is provided with a central aperture 6 which is adapted to receive and tightly engage a thumb. The sides 7 of thumb cup 4, which is shown as approximately rectangular, is designated as the back side thereof, and its wall is provided with the long narrow slot 8 extending therethrough and adapted to receive and engage lineal measuring element 1 without undue play but without excessive restriction of sliding movement of lineal measuring element 1. The upper edge on the open side of thumb cup 4 may conveniently be provided with a curved contour as shown at 9 extending toward the back side 7. The pressure of the thumb upon the front of the thumb piece prevents lineal measuring element 1 from slipping and avoids errors in taking the sleeve measurement, and the form of thumb cup we describe is particularly adapted to attain this result.

Figure 5 shows thumb cup 4 in position on the thumb of a hand H, and lineal measuring element 1 is shown in its position sliding through thumb cup 4 and bent along the contour of the hand H and wrist W. The point of inflection of the wrist contour, where the hand joins the forearm, and which to the eye is the point of reference as to the proper length of a sleeve, is shown at C. Figure 6 shows the thumb cup and lineal measuring element on a hand with the lower edge 10 of a sleeve here shown as unusually long for purposes of illustration. As shown in Figure 6, in employing our measuring device, lineal measuring element 1 is so adjusted with reference to thumb cup 4 that the graduation C on lineal element 1 is in register with the point of inflection C of the wrist. Figure 7 shows the hand and wrist with lineal measuring element 1 and thumb cup 4, with the lower edge 10 of the sleeve in a relatively unusually high position for purposes of illustration.

Figure 8 shows lineal measuring element 1 associated with another convenient form of thumb cup shown at 11, having on each side marginal guides 12 provided with grooves 12a, adapted to slidably receive lineal measuring element 1, instead of having the solid back 7 with the closed long narrow slot 8 of the form of cup shown in Figure 1. In the form of cup shown in Figure 8, a portion of the lineal measuring element 1 which passes through the thumb cup 11 is therefore accessible from outside the cup and can slightly bulge outwardly, which structure has been found to possess advantages under some circumstances. As shown in Figure 9, this form of thumb cup 11 advantageously has a lowered front edge 13 which is downwardly curved to facilitate access to the cup. This form of cup is particularly adapted to apply proper pressure of the cup to lineal measuring element 1, to prevent slipping.

Figure 13 shows still another form of thumb cup 14 which has been found to have especial advantages in application to use. This form of thumb cup 14 is substantially flat on one side as shown at the back portion 16, and the remainder of the cup is formed substantially as a solid of revolution, that is the upper edge 15 for instance is substantially circular. The outer contour of the cup is advantageously shaped so that the upper edge 15 bells out as shown in Figures 14 and 15. The back wall 16 of the cup is provided with a long closed narrow slot 17 adapted to receive and slidably but not loosely engage lineal measuring element 1. Within thumb cup 14 there is provided thumb recess 18 which also advantageously is bounded by a curved surface which is a surface of revolution, so that the curved portion of the cup can be easily turned out on a lathe. The shape of the generating element of recess 18 and the size and contour of recess 18, are so chosen that when a thumb is placed in recess 18 between rear wall 16 and the front of the recess, there is a good purchase for the thumb against the wall of the recess, so that the thumb cup is held frictionally against sliding on lineal measuring element 1. The handle 19 facilitates the grasping of the thumb cup to adjust it on the thumb, and holding it while lineal measuring element 1 is slidably adjusted so that lettered graduation C is in register with the point of inflection of the wrist.

Figure 18 shows a style chart which is displayed in view of the customer while the sleeve length measurement is being taken, and shows a number of different lengths of sleeve in position on the arm, with reference to the point of inflection of the wrist. In Figure 18, the line $x$—$x$ is drawn through the points of inflection of the wrists shown, that is the point C of Figure 5. Style C shows an average length of coat sleeve with reference to the point of inflection of the wrist, as the average customer desires to wear the coat sleeve. Style B shows a somewhat longer sleeve, and Style A shows an extremely long sleeve. Style D shows a sleeve length somewhat shorter than Style C, and Style E shows an extremely short sleeve with reference to the point of inflection of the wrist. In Style B, the lower edge of the sleeve is displaced at a corresponding point from the position shown in Style C, by the distance $b$. In Style A, the lower edge of the sleeve is displaced at a corresponding point from the position of Style C by the distance $a$. In Style D, the lower edge 10 of sleeve 21 is displaced at a corresponding point from the position of the sleeve edge of Style C by a distance $d$. In Style E, the lower edge 10 of sleeve 21 is displaced at corresponding point from the position of sleeve edge 10 of Style C by a distance $e$. The distances $a$, $b$, $d$, $e$, correspond respectively to the distances on lineal measuring element 1 from lettered graduation C to lettered graduations A, B, D, E. That is, on style chart 20, distance $a$ illustrates the effect on the arm of a sleeve length extending to the point A of the graduation shown in Figure 6. It will ordinarily be found convenient to show the style chart of Figure 18 on such a scale that the distances $a$, $b$, $d$, $e$, are respectively equal to the distances CA, CB, CD, CE, of the lettered graduations of lineal measuring element 1, as shown for instance in Figure 6. Hence the style chart 20 of Figure 18 forms inherently in the process of measurement an associated part of lineal measuring element 1. We provide the means for mounting on a single structure the thumb cup and the style chart for keeping the style chart within the field of view of the customer whose thumb is held in the thumb cup while the measurement is being taken. By referring to the style chart, the customer can immediately inform the salesman taking the measure as to which style of sleeve length shown on the chart he desires. If the measurement is being taken at a try-on, the salesman can then measure from the arm pit to the lettered graduation A, B, C, D, E, on lineal measuring element 1 while it is in place on the hand, as in Figure 6.

Figure 19 shows a modified form of our measuring device wherein the lineal measuring element 23 is held in fixed relation to thumb cup 29, and the numbered and lettered graduations, instead of being on lineal measuring element 23, are on a separate slider 24 which is adapted to slide along lineal element 23. The slider 24 is also resiliently flexible and transparent, like lineal element 23, so that the wrist and coat sleeve can be seen therethrough when the lineal element 23 and slider 24 are in position on the wrist as shown in Figure 19. Slider 24 is provided with numbered graduations 27 and with lettered graduations 28. The slider comprises a flat transparent piece indicated at 24, and a back flat piece advantageously of the same material indicated at 25. The two flat pieces 24 and 25 are positioned in parallel relation as shown in Figure 20 with end spacers 26 and are held together by suitable fastening means associated with end spacers 26, not shown. Lineal element 23 slides easily through slider 24 but there is sufficient engagement to prevent slipping. This form of thumb cup and measuring element has some advantages under particular circumstances, but we regard the form of device shown in Figures 1–17 as ordinarily more advantageous, and we regard the device with the particular form of thumb cup shown in Figures 13–17 as the preferred embodiment.

In the form of thumb cup shown in Figures 19–21, the cup is approximately rectangular and relatively long, and has a relatively deep recess 33 for receiving the thumb. A base block 30 is provided at the bottom of the cup, and is attached to supporting arm 31. The side 32 of cup 29 is considered the back side, and lineal measuring element 23 passes inside of the cup adjacent to back side 32 and extends downwardly along the side of base block 30 substantially until it meets supporting arm 31. Lineal measuring element 23 is thereby firmly held in fixed relation to thumb cup 29.

Figure 22 shows a customer having a sleeve length measurement taken with the form of measuring device of Figure 19. A platform is shown at 34 to which is attached a standard 35 having an adjustable clamp 36. An arm 37 is pivotally mounted on clamp 36, and the thumb cup supporting arm 31 is slidably mounted on arm 37. At the top of standard 35, there is provided bracket 38 by which style chart 20 is held directly within the view of the customer, so that while his thumb is in thumb cup 29, he is looking right at the style chart 20. The several adjustments of the standard and arms provide for positioning the thumb cup 29 in any desired position for the persons of different stature. Standard 35 is provided with a rack adapted to engage clamp 36, as particularly shown in Figure 24.

Figure 25 shows the form of thumb cup of Figures 1–4 mounted on the supporting arm 31 of Figure 22, with the lineal measuring element 1 passing through the slot 8 in the back of thumb cup 4.

In operation, the customer stands on the platform and selects on the style chart 20 the style of sleeve length which he desires. Style C is an average length. The clamp 36 and support 31 are adjusted so that the thumb cup is in a position to conveniently receive and tightly engage the thumb of the customer with the thumb touching the bottom of the bowl of the thumb cup. The graduated slidable rule 1 or the graduated slider 24, is then adjusted until the lettered graduation C is in register with the point of inflection of the wrist of the customer, as above explained.

If a coat is being tried on, and the customer desires Style D, the distance in inches or other units is read off directly from the numbered graduations on the scale from the graduation D to the present bottom edge of the sleeve, and this is the amount that sleeve should be shortened or lengthened. A similar measurement is then taken on the other sleeve. This measurement then immediately indicates the present position of the bottom of the sleeve with reference to the point of inflection of the wrist. The necessary alteration is then made, without the necessity of re-alteration. In trying on a ready-made coat which has both sleeves of the same length, if the customer has one arm one-quarter inch shorter than the other, this will be clearly quantitatively measured by the numbered graduations of our device. The five styles shown on the style chart are ordinarily sufficient to show the style of sleeve length which the customer desires, but if necessary, this number of styles may be increased.

In measuring a customer for a custom-made suit, the total length of sleeve may be measured by measuring with a tape the distance from the armpit to the lettered graduation corresponding to the style desired, after the graduated element has been properly adjusted with reference to the point of inflection of the wrist. This is much more accurate and satisfactory than the usual practice of the tailor determining in his own mind as he looks at the tape the point at which the bottom edge of the sleeve should fall and to which the tape measurement should be taken.

Since the letters of the graduations correspond exactly to the lengths of sleeve shown on the style chart, and the customer looks at the style chart while the measurement is being taken, the customer can accurately indicate just how the measurement should be taken to give the desired result.

The employment of a transparent lineal measuring and graduated element makes it possible to clearly see the contour of the wrist and the position of the sleeve bottom while the measurement is being made. The form of thumb cup which we employ is held tightly without slipping on the lineal element by the pressure which is applied when the thumb is in the cup.

Other forms of thumb cup and lineal element may be employed than the specific forms which we describe. Modifications may be made in the style chart and the supporting means, and the styles of sleeves may be shown on the chart on an enlarged or reduced scale instead of full scale.

From the foregoing description of the construction of our improved device, the operation thereof and the method of applying the same to use will be readily understood. It will be seen that we have provided a simple, inexpensive and efficient means for carrying out the objects of the invention and while we have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. In a sleeve length measuring device, a graduated lineal measuring element, and a thumb cup provided with a relatively deep recess adapted to receive and tightly engage a thumb, said cup being provided with a guide-way adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

2. In a sleeve length measuring device, a transparent graduated lineal measuring element, and a thumb cup provided with a relatively deep recess adapted to receive and tightly engage a thumb, said cup being provided with a guide-way adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

3. In a sleeve length measuring device, a resiliently flexible graduated lineal measuring element, and a thumb cup provided with a relatively deep recess adapted to receive and tightly engage a thumb, said cup being provided with a guide-way adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

4. In a sleeve length measuring device, a flat transparent resiliently flexible graduated lineal measuring element, and a thumb cup provided with a relatively deep recess adapted to receive and tightly engage a thumb, said cup being provided with a guide-way adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

5. In a sleeve length measuring device, a graduated lineal measuring element, and a thumb cup provided with a recess adapted to receive and tightly engage a thumb, said cup being provided with an internal slot adapted to slidably receive and engage said lineal measuring element.

6. In a sleeve length measuring device, a graduated lineal measuring element, and a thumb cup provided with a recess adapted to receive and tightly engage a thumb, said cup being provided on one face thereof with grooved marginal guides adapted to slidably receive and engage said lineal measuring element for sliding movement across said face.

7. In a sleeve length measuring device, a resiliently flexible graduated lineal measuring element, and a thumb cup provided with a recess adapted to receive and tightly engage a thumb, said cup being provided on one face thereof with grooved marginal guides adapted to slidably receive and engage said lineal measuring element for sliding movement across said face.

8. In a sleeve length measuring device, a graduated lineal measuring element, and a thumb cup provided with a recess adapted to receive and tightly engage a thumb, said cup being provided with a slide-way adapted to slidably receive and engage said lineal measuring element, said recess being bounded on one side by a substantially flat surface and on the other side by a surface of revolution of approximately elliptical contour.

9. In a sleeve length measuring device, a resiliently flexible graduated lineal measuring element, and a thumb cup provided with a recess adapted to receive and tightly engage a thumb, said cup being provided with a slide-way adapted to slidably receive and engage said lineal measuring element, said recess being bounded on one side by a substantially flat surface and on the other side by a surface of revolution of approximately elliptical contour.

10. In a sleeve length measuring device, a lineal element, a thumb cup fixedly mounted on said lineal element and adapted to receive and tightly engage a thumb, and a graduated scale element slidably mounted on said lineal element.

11. In a sleeve length measuring device, a lineal element, a thumb cup fixedly mounted on said lineal element and adapted to receive and tightly engage a thumb, and a graduated scale element slidably mounted on said lineal element, said lineal element and said scale element being resiliently flexible and transparent.

12. In a sleeve length measuring device, a lineal element, graduated scale means carried by said lineal element, and a thumb cup provided with a relatively deep recess adapted to receive and tightly engage a thumb, said element, said means and said cup being so constructed and arranged that said means is slidably displaceable with reference to said cup.

13. In a sleeve length measuring device, a transparent lineal element, graduated scale means carried by said lineal element, and a thumb cup provided with a relatively deep recess adapted to receive and tightly engage a thumb, said element, said means and said cup being so constructed and arranged that said means is slidably displaceable with reference to said cup.

14. In a sleeve length measuring device, a resiliently flexible lineal element, graduated scale means carried by said lineal element, and a thumb cup provided with a relatively deep recess adapted to receive and tightly engage a thumb, said element, said means and said cup being so constructed and arranged that said means is slidably displaceable with reference to said cup.

15. In a sleeve length measuring device, a graduated lineal measuring element, a thumb cup provided with a relatively deep recess adapted to receive and tightly engage a thumb, and means carried by said cup adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

16. In a sleeve measuring device, a transparent graduated lineal measuring element, a thumb cup provided with a relatively deep recess adapted to receive and tightly engage a thumb, and means carried by said cup adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

17. In a sleeve length measuring device, a resiliently flexible graduated lineal measuring element, a thumb cup provided with a relatively deep recess adapted to receive and tightly engage a thumb, and means carried by said cup adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

18. In a sleeve length measuring device, a flat transparent resiliently flexible graduated lineal measuring element, a thumb cup provided with a relatively deep recess adapted to receive and tightly engage a thumb, and means carried by said cup adapted to slidably receive and engage said lineal measuring element, the bottom of the interior of said thumb cup being positioned to engage and form a stop for the end of the thumb against movement along the direction of the length of said measuring element, and said thumb cup being so constructed and arranged as to hold the thumb substantially parallel with said measuring element.

LE ROY SHULMAN.
HENRY C. JARVIS.